(12) United States Patent
Kim et al.

(10) Patent No.: US 7,619,950 B2
(45) Date of Patent: Nov. 17, 2009

(54) RECORDING MEDIUM AND APPARATUS METHOD FOR FORMING, RECORDING AND REPRODUCING THE RECORDING MEDIUM

(75) Inventors: Jin Yong Kim, Kyunggi-do (KR); Jung Bae Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 727 days.

(21) Appl. No.: 10/849,049

(22) Filed: May 20, 2004

(65) Prior Publication Data

US 2004/0246867 A1 Dec. 9, 2004

(30) Foreign Application Priority Data

May 20, 2003 (KR) .................. 10-2003-0031912

(51) Int. Cl.
*G11B 7/00* (2006.01)
(52) U.S. Cl. .................. 369/44.13; 369/275.3; 369/278
(58) Field of Classification Search ........................ None
See application file for complete search history.

(56) References Cited

U.S. PATENT DOCUMENTS

| | | | |
|---|---|---|---|
| 5,513,260 A | 4/1996 | Ryan | |
| 5,809,006 A * | 9/1998 | Davis et al. ............... | 369/47.49 |
| 5,848,050 A * | 12/1998 | Nagasawa et al. ......... | 369/275.4 |
| 6,108,296 A | 8/2000 | Kajiyama et al. | |
| 6,847,599 B2 | 1/2005 | Hayashi | |
| 7,006,419 B2 | 2/2006 | Yokoi | |
| 7,151,729 B1 * | 12/2006 | Park et al. .................. | 369/53.2 |
| 7,266,074 B2 * | 9/2007 | Kim et al. ............... | 369/124.12 |
| 2002/0021635 A1 | 2/2002 | Park et al. | |
| 2003/0067858 A1 | 4/2003 | Kuroda et al. | |
| 2003/0227853 A1 | 12/2003 | Kim et al. | |
| 2004/0001414 A1 | 1/2004 | Kadowaki et al. | |
| 2004/0120247 A1 | 6/2004 | Lee et al. | |
| 2004/0165494 A1 | 8/2004 | Suh et al. | |
| 2004/0168074 A1 | 8/2004 | Suh et al. | |
| 2004/0168075 A1 | 8/2004 | Suh et al. | |
| 2004/0223427 A1 | 11/2004 | Kim et al. | |
| 2004/0233804 A1 | 11/2004 | Suh et al. | |
| 2004/0233809 A1 | 11/2004 | Suh et al. | |
| 2004/0252603 A1 | 12/2004 | Suh et al. | |

(Continued)

FOREIGN PATENT DOCUMENTS

EP 0 703 576 AL 3/1996

(Continued)

OTHER PUBLICATIONS

Office Action issued Jul. 6, 2007 by the U.S. Patent and Trademark Office in related U.S. Appl. No. 10/849,050.

(Continued)

*Primary Examiner*—Joseph Feild
*Assistant Examiner*—Tawfik Goma
(74) *Attorney, Agent, or Firm*—Harness, Dickey & Pierce P.L.C.

(57) ABSTRACT

A recording medium, such as a high-density and/or read-only recording medium, such as BD-ROM, which includes copy protection information for preventing illegal copying of the contents recorded on the recording medium, and to methods and apparatuses for forming, recording, and reproducing data on the recording medium.

30 Claims, 8 Drawing Sheets

U.S. PATENT DOCUMENTS

| | | |
|---|---|---|
| 2005/0063261 A1 | 3/2005 | Kim et al. |
| 2005/0105432 A1 | 5/2005 | Suh et al. |
| 2005/0209971 A1 | 9/2005 | Suh et al. |
| 2006/0143480 A1 | 6/2006 | Suh et al. |
| 2006/0156038 A1 | 7/2006 | Suh et al. |
| 2006/0164944 A1 | 7/2006 | Suh et al. |
| 2006/0262712 A1 | 11/2006 | Suh et al. |
| 2008/0043607 A1 | 2/2008 | Suh et al. |
| 2008/0056092 A1 | 3/2008 | Kim et al. |

FOREIGN PATENT DOCUMENTS

| | | |
|---|---|---|
| EP | 0 936 610 A2 | 8/1999 |
| EP | 0 997 899 A2 | 5/2000 |
| JP | 2001-076141 | 3/2001 |
| WO | WO 2004/075187 AL | 9/2004 |

OTHER PUBLICATIONS

International Search Report issued Sep. 9, 2004 in counterpart International Application No. PCT/KR2004/001196.

\* cited by examiner

*Biphase modulated HFM groove*

RECORDING MEDIUM AND APPARATUS METHOD FOR FORMING, RECORDING AND REPRODUCING THE RECORDING MEDIUM

CROSS-REFERENCE TO RELATED APPLICATIONS

This U.S. nonprovisional patent application claims priority under 35 U.S.C. §119 of Korean Patent Application 2003-0031912 filed on May 20, 2003, the entire contents of which are hereby incorporated by reference.

BACKGROUND OF THE INVENTION

1. Field of the Invention

The present invention relates to a recording medium such as high density optical recording medium, e.g., BD-ROM (Blu-ray Disc ROM), which includes control information, e.g., copy protection information and an apparatus and methods for forming, recording, reproducing, and restricting reproduction of illegally duplicated recording media.

2. Description of the Related Art

Recently, standardization of Blu-ray Disc Rewritable (BD-RE), which is a new high-density rewritable optical disc capable of recording large capacity high-quality video and audio data, is in progress. BD-RE related products are expected to be available on the market in the near future.

Figure 1:
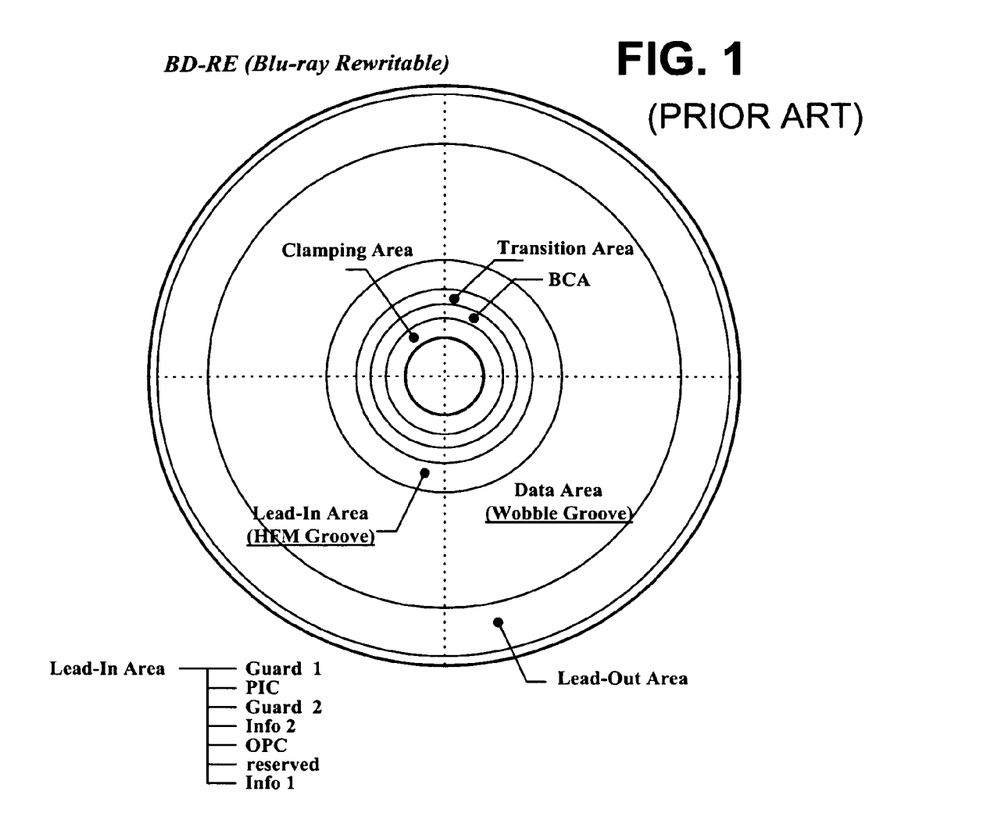
FIG. 1 illustrates the structure of a conventional BD-RE.

FIG. 1A depicts the structure of a BD-RE, wherein a clamping area, a burst cutting area (BCA), a transition area, a lead-in area, a data area, and lead-out area are disposed in order as shown.

The lead-in area includes several pre-assigned areas such as a first guard (Guard 1) area, a permanent information & control data (PIC) area, a second guard (Guard 2) area, a second (Info 2) and a first information (Info 1) area, and an optimum power calibration (OPC) area. The Guard 1 area and the PIC area are pre-recorded areas in which some initial data is pre-recorded, whereas the other areas of the lead-in area, the data area, and the lead-out areas are all rewritable areas.

The second guard area may be used as a buffer zone for the changeover from the embossed HFM area to the Rewritable area.

The OPC area may be reserved for testing and OPC procedures.

Figure 2:
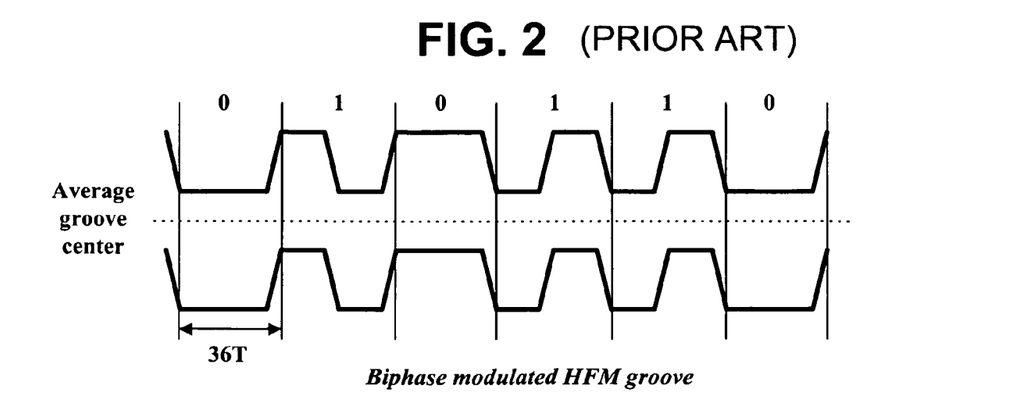
FIG. 2 illustrates a high-frequency modulated (HFM) groove formed in the PIC area of a BD-RE.

In the PIC area, important permanent disc information is encoded in a wobbled groove by high frequency modulation (HFM). As depicted in FIG. 2, the wobble-shaped data encoding is performed by bi-phase modulation. In this modulation method, a bit with value 0 may be represented by a transition at the start of the bit cell and a bit with value 1 may be represented by a transition at the start and in the middle of the bit cell. The modulated bits may be recorded on the disc by a deviation of the groove from its average centerline as indicated in FIG. 2. The length of each bit cell may be 36 T, where T corresponds to the length of a channel bit in the rewritable data areas.

Figure 3:
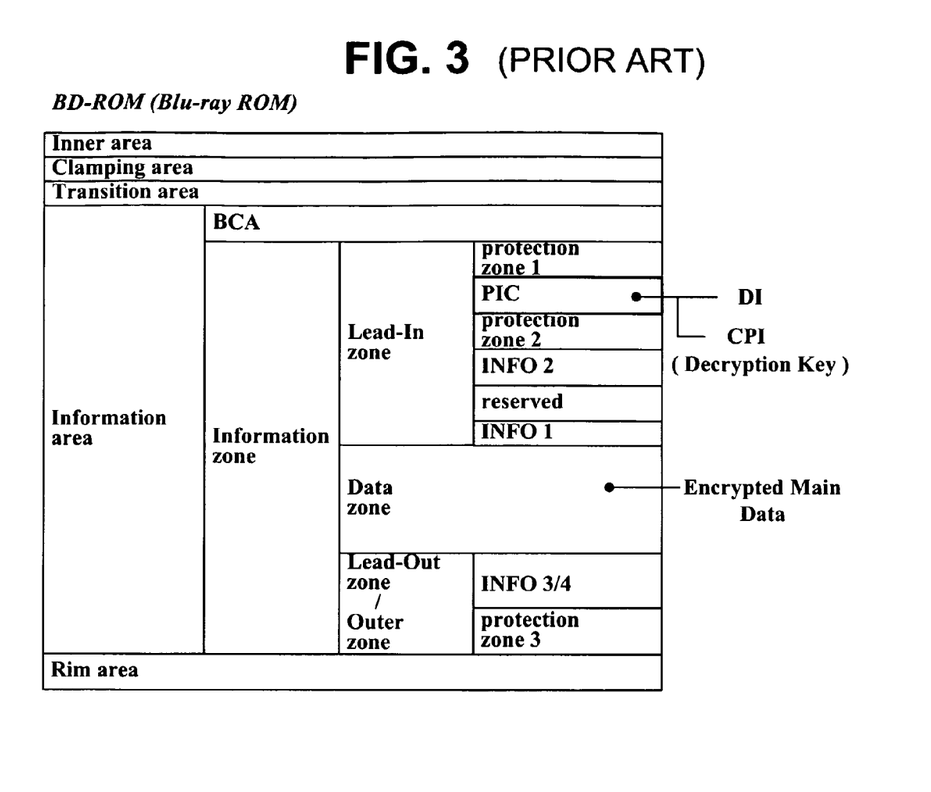
FIG. 3 illustrates areas assigned to a BD-ROM.

Also, a read-only Blu-ray Disc (BD-ROM) is also under development along with the development of BD-RE. A BD-ROM may include an inner area, a clamping area, a transition area, an information area, and a rim area, as shown in FIG. 3.

The main data of an audio/video (A/V) stream is recorded in the data zone belonging to the information area in an encrypted format using copy protection information (CPI) to help prevent an illegal copy.

Various types of disc information, such as a disc type, may be recorded in the PIC zone belonging to the information area. Where the main data stored in the data zone is encrypted, the CPI for decrypting the data is also recorded in the PIC zone.

Once an optical disc is loaded into an optical disc reproducing apparatus, the optical disc reproducing apparatus detects the CPI recorded in the PIC zone and then decrypts the main data recorded in the data zone, if the main data is stored in an encrypted format.

The CPI protects the contents recorded on the read-only recording medium; hence it is recorded in such a way that it may not be copied to another medium by data copy operations.

SUMMARY OF THE INVENTION

In exemplary embodiments, the present invention is directed to a recording medium, such as a high-density and/or read-only recording medium, such as BD-ROM, which includes copy protection information for preventing illegal copying of the contents recorded on the recording medium, and to methods and apparatuses for forming, recording, and reproducing data on the recording medium.

In exemplary embodiments, the present invention is directed to a recording medium, such as a high-density and/or read-only recording medium, such as BD-ROM, wherein the copy protection information is not detectable by conventional methods for detecting recorded signals, and to methods and apparatuses for forming, recording, and reproducing data on the recording medium.

In exemplary embodiments, the present invention is directed to a recording medium, such as a high-density and/or read-only recording medium, such as BD-ROM, which includes encoded copy protection information for preventing illegal copying of contents, and to methods and apparatuses for forming, recording, and reproducing data on the recording medium.

In exemplary embodiments, the present invention is directed to a recording medium, such as a high-density and/or read-only recording medium, such as BD-ROM, which includes copy protection information encoded in phase wobbled (or zigzagged) pits, and to methods and apparatuses for forming, recording, and reproducing data on the recording medium.

In exemplary embodiments, the present invention is directed to a recording medium, such as a high-density and/or read-only recording medium, such as BD-ROM, which includes data recorded as pits formed along tracks, where a frame sync signal or other signal indicative of the start of a data frame is encoded in straight pits and a segment of data positioned after the frame sync signal or other signal indicative of the start of a data frame is encoded in wobbled (or zigzagged) pits shifted from the track center to the left and/or right, and to methods and apparatuses for forming, recording, and reproducing data on the recording medium.

In exemplary embodiments, the present invention is directed to a recording medium, such as a high-density and/or read-only recording medium, such as BD-ROM, wherein the frame sync signal indicative of the start of a data frame is encoded in straight pits and a segment of data positioned after the frame sync signal is encoded in wobbled (or zigzagged) pits shifted from the track center to the left and/or right, and to methods and apparatuses for forming, recording, and reproducing data on the recording medium.

In exemplary embodiments, the present invention is directed to a recording medium, such as a high-density and/or read-only recording medium, such as BD-ROM, wherein data is encoded in wobbled pits formed on the recording medium, a frame sync signal indicative of the start of a data frame is detectable from an RF reproduced signal created by pits formed along tracks existing on the recording medium, one or more push-pull signals created by the difference of beams reflected by left and right portions around the track center are integrated for a given time interval, a value of an output data bit is based on the integrated value, and to methods and apparatuses for forming, recording, and reproducing data on the recording medium.

In exemplary embodiments, the present invention is directed to a recording medium, such as a high-density and/or read-only recording medium, such as BD-ROM, wherein data is encoded in wobbled pits formed on the recording medium, a frame sync signal or other signal indicative of the start of a data frame is detectable from an RF reproduced signal created by pits formed along tracks existing on the recording medium, one or more push-pull signals created by the difference of beams reflected by left and right portions around the track center are generated, a timing signal indicative of an integration interval and whether to invert the sign of the push-pull signal is generated, the push-pull signal is integrated based on the timing signal, and a value of a data bit is output based on the integrated value, and to methods and apparatuses for forming, recording, and reproducing data on the recording medium.

In exemplary embodiments, the present invention is directed to a recording medium including recorded data, the recording medium including an information area, the information area including a first region for the recorded data and a second region for information which controls recording or reproduction of the recorded data, said second region including a data unit, the data unit including a first portion having first data encoded in straight type and a second portion having said information encoded in wobbled type by bi-phase modulation.

In other exemplary embodiments, the present invention is directed to a method of forming a recording medium, the method including forming a first region for storing recorded data and forming a second region for storing information which controls recording or reproduction of the recorded data, said second region including a data unit, the data unit including a first portion having first data encoded in straight type and a second portion having said information encoded in wobbled type by bi-phase modulation.

In other exemplary embodiments, the present invention is directed to a method of reproducing or recording data from or on a recording medium, the method including detecting information which controls recording or reproduction of the data, said information included in a control region, the control region including a data unit, the data unit including a first portion having first data encoded in straight type and a second portion having said information encoded in wobbled type by bi-phase modulation and controlling the reproduction or recording of data based on said information.

In other exemplary embodiments, the present invention is directed to a method of recording data on a recording medium, the method including recording the data and recording information which, controls recording of the data to be recorded, said information included in a control region, the control region including a data unit, the data unit including a first portion having first data encoded in straight type and a second portion having said information encoded in wobbled type by bi-phase modulation.

In other exemplary embodiments, the present invention is directed to an apparatus for reproducing data from a recording medium, said apparatus including a detection unit to detect information, which controls reproduction of the recorded data, from a control region, wherein the control region including a data unit, the data unit including a first portion having first data encoded in straight type and a second portion having said information encoded in wobbled type by bi-phase modulation and a controller to control the reproduction of recorded data based on the detected information.

BRIEF DESCRIPTION OF THE DRAWINGS

The accompanying drawings, which are included to provide a further understanding of the invention, illustrate exemplary embodiments of the invention, and together with the description, serve to explain the principles of the present invention.

In the drawings.

DETAILED DESCRIPTION OF EXEMPLARY EMBODIMENTS

In order that the invention may be fully understood, exemplary embodiments thereof will now be described with reference to the accompanying drawings.

A BD-ROM in accordance with an exemplary embodiment of the invention has a disc structure including an inner area, a clamping area, a transition area, an information area, and a rim area, as shown in FIG. 3.

Figure 4:
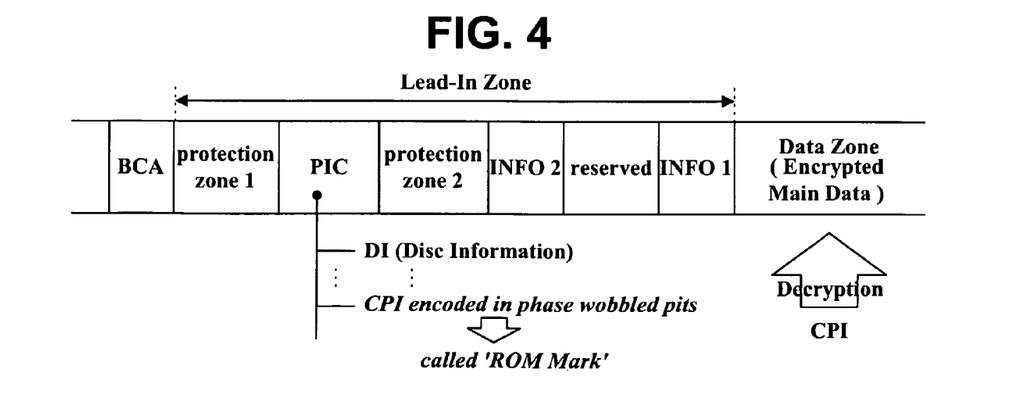
FIG. 4 illustrates an exemplary embodiment of the copy protection information recorded in the PIC zone of a BD-ROM.

As illustrated in FIG. 4, general disc information and the copy protection information (CPI) for decrypting main data recorded in the data zone may be recorded in the PIC zone. The copy protection information (CPI) may also be referred to as the 'ROM mark'.

The CPI may be encoded in wobbled pits formed along tracks of the disc so that the CPI may not be detected by conventional RF signal detecting methods for detecting data encoded in straight pits.

Figure 5:
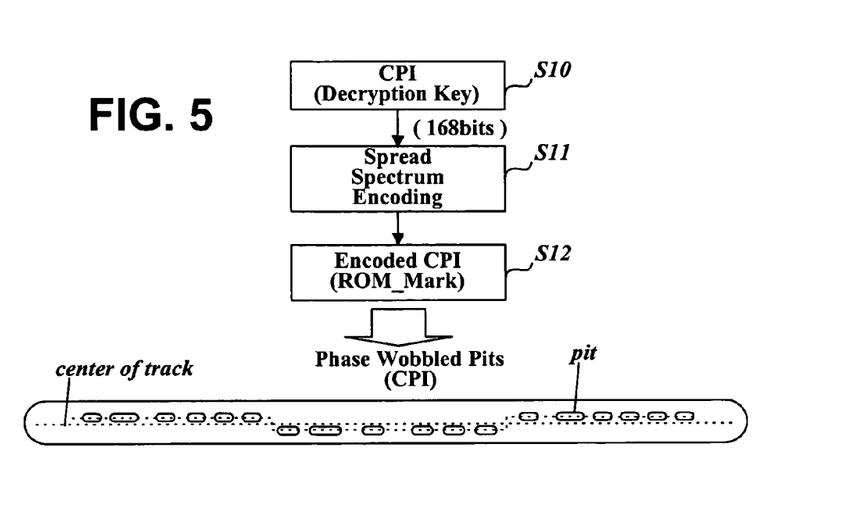
FIG. 5 illustrates the process of encoding the copy protection information in wobbled pits in an exemplary embodiment of the present invention.

FIG. 5 illustrates an exemplary process of encoding the CPI in wobbled pits. The CPI, which may be a decryption key of size 168 bits, is created in the middle of authoring a BD-ROM (S10). The created CPI may be spread spectrum encoded (S11) and then encoded in wobbled pits according to the encoded data bits (S12).

The pit pattern data itself may be a disc control information in the PIC zone, such as a disc type, disc size/version, and channel bit length and so on.

Figure 6:
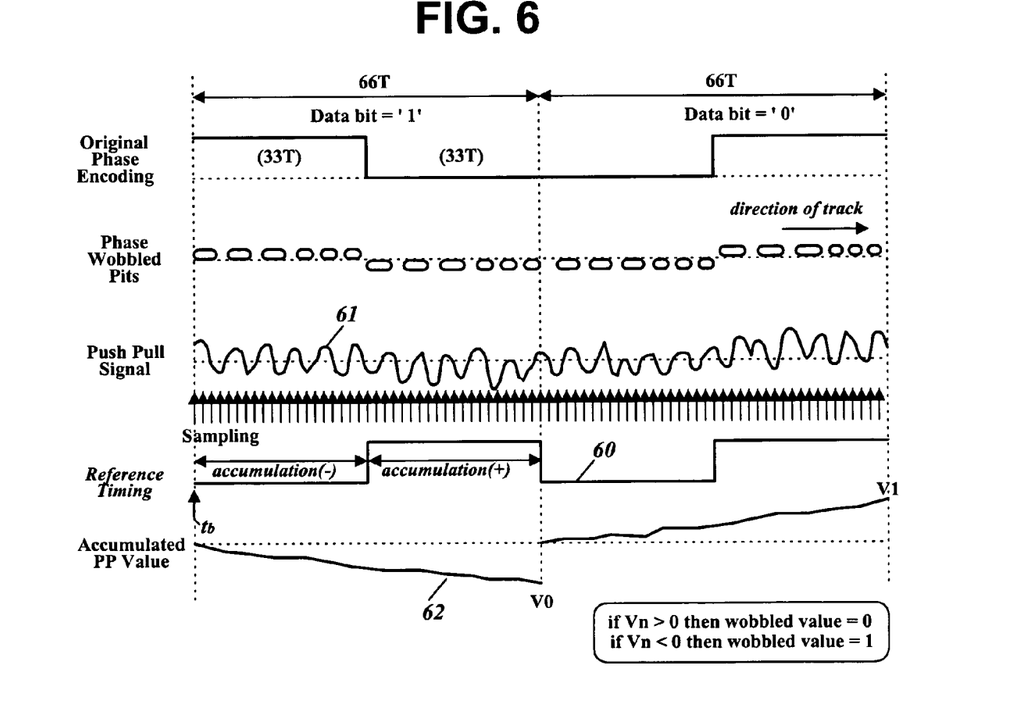
FIG. 6 illustrates a phase wobbled pit train in which data bits are encoded and the process of detecting the data bits in an exemplary embodiment of the present invention.

FIG. 6 illustrates an exemplary phase wobbled pit train in which data bits are encoded and an exemplary process of detecting the data bits.

In the exemplary embodiment shown in FIG. 6, a data bit of the CPI is encoded in a train of pits having a length corresponding to 66 T, wherein the pits are shifted from the track center to the left or right and the shifted phase is reversed at the point corresponding to 33 T, that is, in the middle of the 66 T-long pit train. The data bit encoded in the wobbled pit train can be detected by a push-pull signal created by the pit train.

Since the CPI encoded in phase wobbled pits cannot be detected by conventional RF detecting methods, the security of the CPI is enhanced. An exemplary method for detecting data bits encoded in phase wobbled pits will be described in detail after an exemplary recording format of phase wobbled pit trains is explained.

Figure 7:
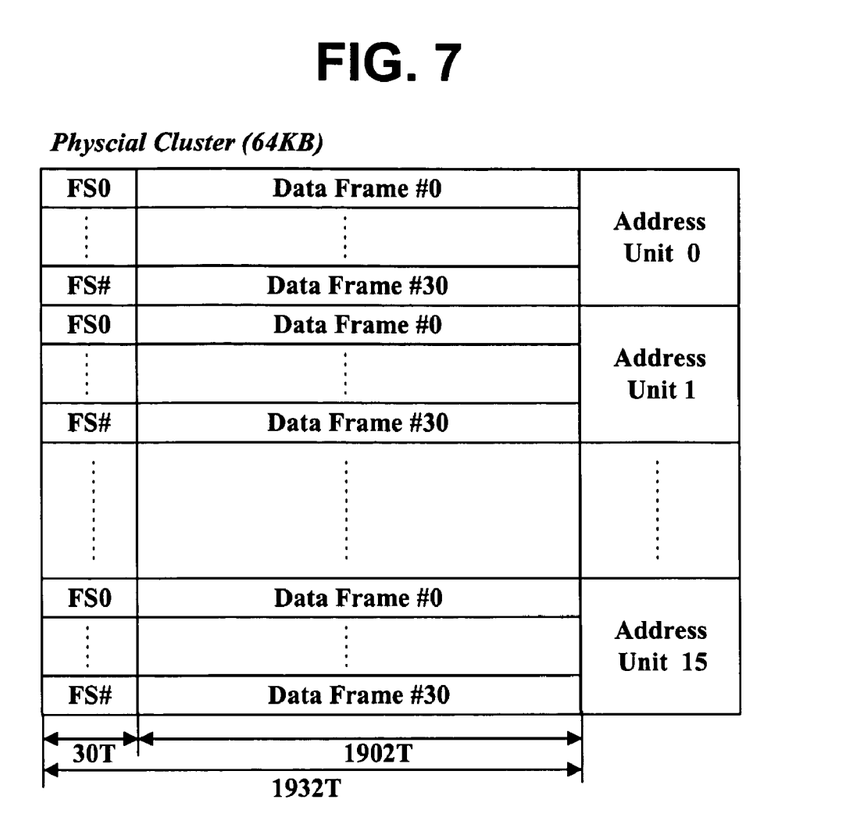
FIG. 7 illustrates the data structure of a physical cluster of a BD-ROM in an exemplary embodiment of the present invention.

FIG. 7 illustrates an exemplary logical recording format of the BD-ROM. A physical cluster, which is the basic data unit of the BD-ROM, may have size of 64 KB and may include 16 address units. Each address unit may further include 31 data frames (Data Frame #0~Data Frame #30) each of which may contain a leading frame sync signal.

A frame sync signal may have a length corresponding to 30 T and a data frame may have a length corresponding to 1,902 T.

Figure 8:
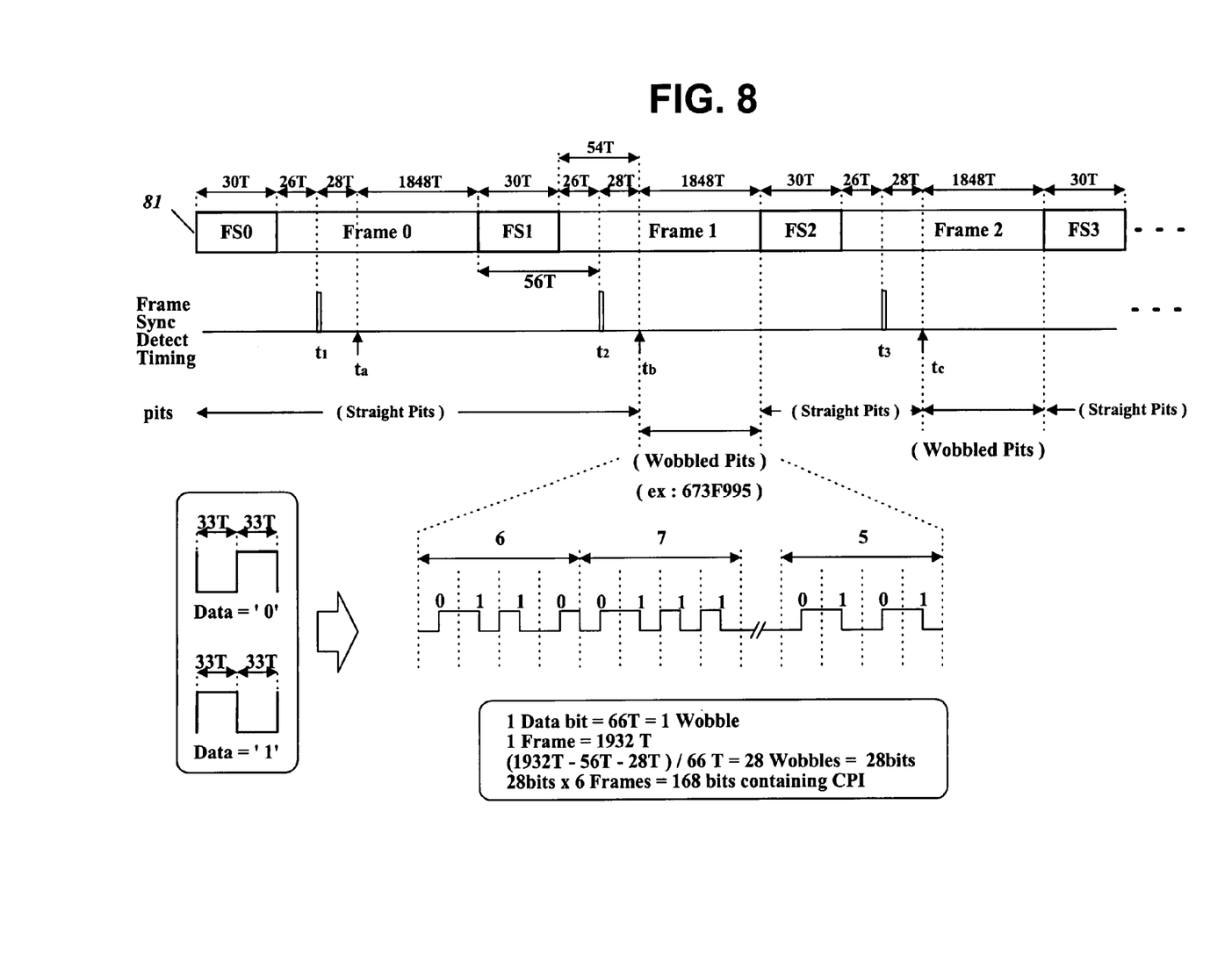
FIGS. 8 to 10 illustrate several exemplary embodiments of encoding the copy protection information in wobbled pits.

FIG. 8 illustrates an exemplary embodiment of the copy protection information encoded in wobbled pits according to the exemplary recording format depicted in FIG. 7.

As set forth above, a data frame may have a length corresponding to 1,902 T (1,932 T if the frame sync signal is included). If a data bit is encoded in 66 T-long phase wobbled pits, 28-bit data can be recorded in a data frame with a remaining length corresponding to 54 T (=1902−28*66).

As a result, a data frame may include 1,848 T-long phase wobbled pits and 54 T-long straight pits.

If the CPI is 168 bits, 6 data frames are needed for storing the CPI because a data frame contains 7 nibbles (=28 bits). In FIG. 8, the CPI is divided into 6 chunks of 28 bits and the divided 6 chunks are recorded in 6 data frames from Frame #1 to Frame #6, one chunk being contained in one data frame. In FIG. 8, for example, a value of '673F995' is encoded in phase wobbled pits of Frame #1.

In other exemplary embodiments, a pit train for encoding a data bit may have a length other than 66 T.

Figure 9:
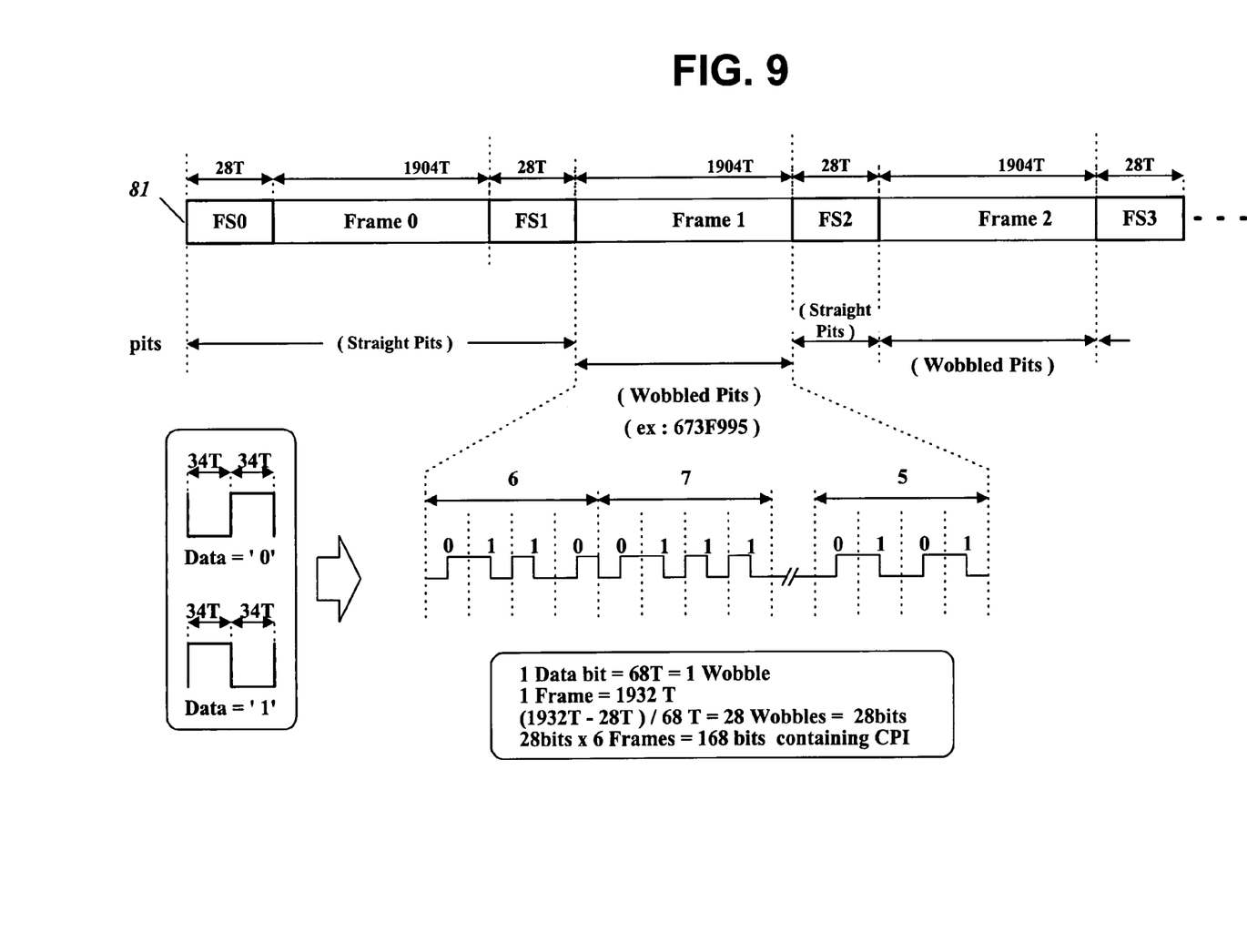

If a data bit is encoded in a train of wobbled pits of a length corresponding to 68 T, a 1,904 T-long pit train is needed for encoding 28-bit data. In exemplary embodiments, therefore, the length of the frame sync signal should be reduced to 28 T. FIG. 9 illustrates an exemplary embodiment according to this format.

In this exemplary embodiment, however, the frame sync signal is shortened, which may lead to less reliable frame sync detection. In another exemplary embodiment, the size of data recorded in a data frame is reduced to 24 bits without shortening the frame sync signal.

Figure 10:
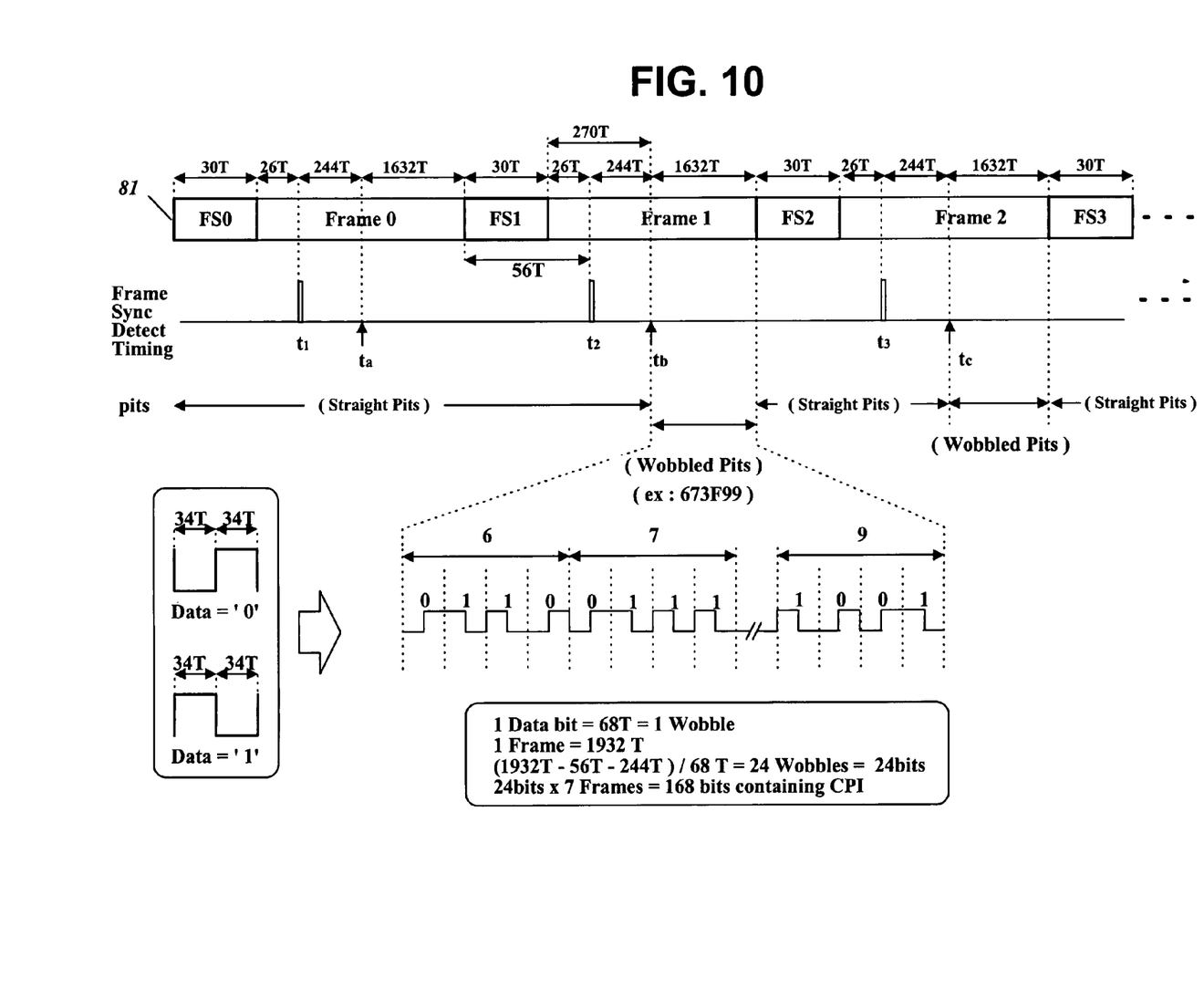

According to this exemplary format, a train of wobbled pits of length 1,632 T (=24*68 T) can encode 24-bit data and thus a length corresponding to 270 T remains after 24-bit data is recorded in a data frame, which is illustrated in FIG. 10. In this exemplary embodiment, CPI of size 168 bits is recorded in 7 data frames.

Since the CPI can be recorded in one address unit in all the aforementioned exemplary embodiments, the CPI can be repeatedly recorded in more than two address units or can be recorded in one address unit more than twice.

An exemplary method for detecting data encoded in phase wobbled pits will be described below in conjunction with FIG. 11.

Figure 11:
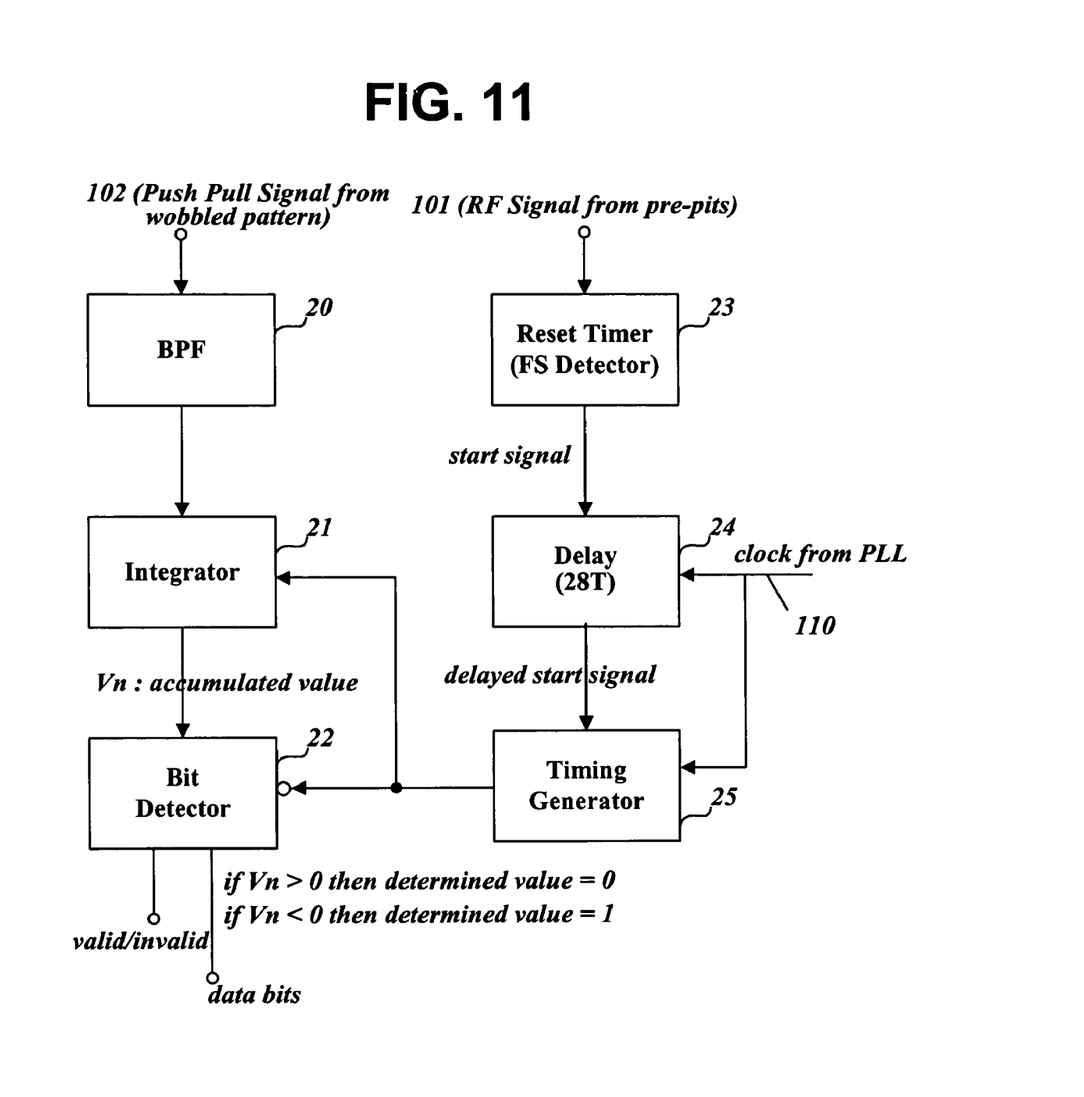
FIG. 11 illustrates a block diagram of an apparatus for detecting data encoded in phase wobbled pits in accordance with an exemplary embodiment of the invention.

FIG. 11 illustrates a block diagram of an apparatus for detecting data encoded in phase wobbled pits in accordance with an exemplary embodiment of the invention.

The apparatus includes a band-pass filter 20 for only passing the frequency components of the push-pull signal created by the wobbled pits, an integrator 21 for sampling and accumulating the push-pull signal, a bit detector 22 for detecting data bits from the output of the integrator 21, a reset timer 23 for detecting frame sync from the RF signal created by prepits and for generating a start signal on detecting a frame sync signal, a delay 24 for delaying the start signal by a prescribed time duration, and a timing generator 25 for generating a timing signal on the basis of a clock signal which is provided by an external PLL and synchronized with the reproduced signal.

If the apparatus is employed to detect the data recorded according to the exemplary format illustrated in FIG. 8, the delay 24 delays a start signal received from the reset timer 23 by 28 T on the basis of the PLL clock 110. Upon receiving the delayed start signal, the timing generator 25 generates the square wave signal 60 depicted in FIG. 6, the level of which is inverted at intervals of 33 T on the basis of the PLL clock 110.

If the apparatus detects the data recorded according to the exemplary format illustrated in FIG. 10, the delay 24 delays a start signal received from the reset timer 23 by 244 T on the basis of the PLL clock 110 and the timing generator 25 generates a square signal the level of which is inverted at intervals of 34 T.

If a BD-ROM having the exemplary recording format illustrated in FIG. 8 is loaded into the exemplary apparatus and signals from tracks are detected, the RF signal 101, which is the sum of the signals from four photo diodes, is applied to the reset timer 23 and the push-pull signal 102, which is the difference between left and right portions of the signals from the photo diodes, is applied to the band-pass filter 20.

Because the RF signal 101 includes data frames 81 depicted in FIG. 8, the reset timer 23 detects frame sync from the RF signal and outputs a start signal to the delay 24 whenever a frame sync signal is detected. It takes 26 T for the reset timer 23 to detect a frame sync signal from the RF signal, which means that the delay 24 receives a start signal from the reset timer 23 with a time delay of 26 T (t1, t2, t3, . . . in FIG. 8).

Receiving the start signal, the delay 24 delays the start signal again by 28 T and outputs the 28 T-delayed start signal to the timing generator 25. At this point (ta, tb, tc . . . in FIG. 8), phase wobbled pits are switched to straight pits if phase wobbled pits exist on the disc.

The timing generator 25 begins to count the PLL clock 110 the moment and generates the square wave timing signal 60 in FIG. 6 the level of which is inverted at intervals of 33 T.

The band-pass filter 20 filters the push-pull signal 102 to reject noises contained in the push-pull signal and outputs the band-pass filtered signal to the integrator 21. The input to the integrator 21 is similar to the signal 61 shown in FIG. 6, the DC level of which varies slowly according to the shifted direction of the wobbled pits.

The integrator 21 samples the push-pull signal at constant intervals and accumulates the sampled values. If the level of the timing signal 60 is '0' when a sampled value is to be added, the sign of the sampled value is inverted before it is added. In other words, a positive value is converted into a negative value with the same magnitude and vice versa.

The signal corresponding to the accumulated value is outputted to the bit detector 22. The signal outputted from the integrator 21 is similar to the waveform 62 shown in FIG. 6.

The bit detector 22 determines the value of a data bit by the sign of the accumulated value corresponding to the data bit. If the accumulated value is a positive number having a magnitude exceeding a preset threshold level when the level of the timing signal 60 changes from '1' to '0', the data bit is considered '0'. If the accumulated value is a negative number having a magnitude exceeding a preset threshold level, the data bit is considered '1'.

If the magnitude of an accumulated value is less than the preset threshold level in each case, the push-pull signal has likely been created, not by wobbled pits, but by straight pits and therefore the bit detector 22 generates a signal indicating that the data bit is invalid When the level of the timing signal 60 changes from '1' to '0', the integrator 21 resets the accumulated value to zero and starts a new sampling and accumulating process.

In this exemplary embodiment, the sampled values are accumulated in such a way that the sign of a sampled value is inverted before the sampled value is added while the level of the timing signal 60 is '0'. The accumulation method is not unique and depends on detecting circuitry and phase encoding methods.

The CPI, which is encoded in phase wobbled pits in order not to be detected by the RF signal, can be detected by the exemplary method described above.

The method and apparatus for recording/detecting copy protection information on/from a high-density read-only optical disc in accordance with exemplary embodiments of the present invention makes it difficult to detect the recorded copy protection information, thereby preventing illegal copying of the contents contained in the optical disc to other media.

Although certain specific exemplary embodiments of the present invention have been disclosed, it is noted that the present invention may be embodied in other forms without departing from the spirit or essential characteristics thereof. The present embodiments are therefore to be considered in all respects as illustrative and not restrictive, the scope of the invention being indicated by the appended claims, and all changes that come within the meaning and range of equivalency of the claims are therefore intended to be embraced therein.

We claim:

1. A recording medium including recorded data, comprising:
    an information area, the information area including a first region for the recorded data and a second region for information which controls recording or reproduction of the recorded data, said second region including a data unit, the data unit including a first portion having first data encoded in straight type and a second portion having said information encoded in wobbled type by bi-phase modulation
    wherein the recorded data is recorded as straight pits formed along tracks, the first portion includes a frame sync signal indicative of the start of a data frame and is encoded in straight pits, and the second portion is positioned after the first portion having the frame sync signal and is encoded in straight pits and wobbled pits shifted from a track center to the left and/or right; and
    wherein said information is recorded in a lead-in zone of the information area of the recording medium.

2. The recording medium according to claim 1, wherein said information is recorded in a permanent information & control (PIC) data area of the lead-in zone of the information area of the recording medium.

3. The recording medium according to claim 1, wherein said information is recorded in a permanent information & control (PIC) data area of the lead-in zone of the information area of the recording medium as part of disc information.

4. The recording medium according to claim 1, wherein the first data of the first portion is a sync signal.

5. The recording medium according to claim 1, wherein the second portion further includes a straight part of a given length followed by the wobbled part of the information.

6. The recording medium according to claim 5, wherein a number of channel bits comprising a data bit are different based on the given length.

7. The recording medium according to claim 1, wherein said second region includes a plurality of data units, each data unit having the first portion and second portion.

8. The recording medium according to claim 7, wherein said information is included in the plurality of second portions.

9. The recording medium of claim 1, wherein the distance between said information encoded in wobbled pits and the frame sync signal is greater than a distance corresponding to the time required for detecting the frame sync signal from an RF reproduced signal created by said straight pits.

10. The recording medium of claim 1, wherein a length of the straight pits and a length of the wobbled pits depends on at least one of a number of pits assigned to a single bit, a length of the frame sync signal, a length of the information, and a time required for detecting the frame sync signal created by said straight pits.

11. The recording medium of claim 1, wherein said information is divided in chunks across multiple data frames, each chunk is recorded in an array of wobbled pits.

12. The recording medium of claim 1, wherein said information is detected by a push-pull signal created by a pit train including at least one of the straight pits and the wobbled pits.

13. The recording medium of claim 1, wherein an address unit includes more than one data frame, the recording medium includes more than one address unit, and said information is recorded in more than one address unit.

14. The recording medium of claim 1, wherein an address unit includes more than one data frame, the recording medium includes more than one address unit, and said information is recorded more than once in one address unit.

15. A method of forming a recording medium, comprising:
    forming a first region for storing data; and
    forming a second region for storing information which controls recording or reproduction of the recorded data, said second region including a data unit, the data unit including a first portion having first data encoded in straight type and a second portion having said information encoded in wobbled type by bi-phase modulation,
    wherein the recorded data is recorded as straight pits formed along tracks, the first portion includes a frame sync signal indicative of the start of a data frame and is encoded in straight pits, and the second portion is positioned after the first portion having the frame sync signal and is encoded in straight pits and wobbled pits shifted from a track center to the left and/or right; and
    wherein said information is recorded in a lead-in zone of the information of the recording medium.

16. The method according to claim 15, wherein said information is recorded in a permanent information & control (PIC) data area of the lead-in zone of the information area of the recording medium.

17. The method according to claim 15, wherein the first data of first portion is sync signal.

18. The method according to claim 15, wherein the second portion further includes a straight part of a given length followed by the wobbled part of the information.

19. The method according to claim 18, wherein a number of channel bits comprising a data bit are different based on the given length.

20. The method according to claim 15, wherein said second region includes a plurality of data units, each data unit having the first portion and second portion.

21. The method according to claim 20, wherein said information is included in the plurality of second portions.

22. The method according to claim 15, wherein the distance between said information encoded in wobbled pits and the frame sync signal is greater than a distance corresponding to the time required for detecting the frame sync signal from an RF reproduced signal created by said straight pits.

23. The method according to claim 15, wherein a length of the straight pits and a length of the wobbled pits depends on at least one of a number of pits assigned to a single bit, a length of the frame sync signal, a length of the information, and a time required for detecting the frame sync signal created by said straight pits.

24. The method according to claim 15, wherein said information is divided in chunks across multiple data frames, each chunk is recorded in an array of wobbled pits.

25. The method according to claim 15, wherein an address unit includes more than one data frame, the recording medium includes more than one address unit, and said information is recorded in more than one address unit.

26. The method according to claim 23, wherein an address unit includes more than one data frame, the recording medium includes more than one address unit, and said information is recorded more than once in one address unit.

27. The recording medium according to claim 1, wherein wobbled pits are preceded by straight pits of more than 26 T in the second portion.

28. The recording medium according to claim 27, wherein the wobbled pits are preceded by straight pits of 54 T or 270 T in the second portion.

29. The method according to claim 15, wherein the wobbled pits are preceded by straight pits of more than 26 T in the second portion.

30. The method according to claim 29, wherein the wobbled pits are preceded by straight pits of 54 T or 270 T in the second portion.

* * * * *